United States Patent
Degagne et al.

(10) Patent No.: US 10,059,466 B2
(45) Date of Patent: *Aug. 28, 2018

(54) SYSTEM AND METHOD FOR DYNAMICALLY DETERMINING RUNWAY STOPPING DISTANCE

(71) Applicants: Louis Degagne, West Granby, CT (US); Derek Campbell, Canton, CT (US)

(72) Inventors: Louis Degagne, West Granby, CT (US); Derek Campbell, Canton, CT (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/170,174

(22) Filed: Jun. 1, 2016

(65) Prior Publication Data

US 2016/0272344 A1    Sep. 22, 2016

Related U.S. Application Data

(63) Continuation-in-part of application No. 14/661,045, filed on Mar. 18, 2015, now Pat. No. 9,378,646.

(51) Int. Cl.
| | |
|---|---|
| *B64F 1/20* | (2006.01) |
| *G08G 5/00* | (2006.01) |
| *G08G 5/02* | (2006.01) |
| *B64D 45/08* | (2006.01) |

(52) U.S. Cl.
CPC .............. *B64F 1/20* (2013.01); *B64D 45/08* (2013.01); *G08G 5/0021* (2013.01); *G08G 5/0026* (2013.01); *G08G 5/025* (2013.01)

(58) Field of Classification Search
CPC .......... B64F 1/20; G08G 5/0021; G08G 5/25; G08G 5/26; G64D 45/08
See application file for complete search history.

(56) References Cited

U.S. PATENT DOCUMENTS

| | | | | |
|---|---|---|---|---|
| 3,813,064 A | * | 5/1974 | Heyworth ................. | B64F 1/18 116/63 P |
| 6,567,043 B2 | * | 5/2003 | Smith ................... | G01S 13/781 342/450 |
| 6,978,205 B2 | * | 12/2005 | Ryan ..................... | B64C 25/426 340/961 |
| 7,244,042 B1 | * | 7/2007 | Bieberdorf ................ | B64F 1/18 362/153 |

(Continued)

OTHER PUBLICATIONS

Wikipedia.org. "Precision Approach Path Indicator". Archived on Jun. 23, 2011 by archive.org. Accessed on Mar. 29, 2018. (Year: 2011).*

(Continued)

*Primary Examiner* — Jeffrey C Boomer
(74) *Attorney, Agent, or Firm* — Grogan, Tuccillo & Vanderleeden, LLP

(57) ABSTRACT

A ground-based system for determining a stopping point of an aircraft on a runway includes a position sensing means for gathering data regarding incremental positions of the aircraft relative to the runway, a calculating means for dynamically computing the projected stopping point of the aircraft based on the data gathered by the position sensing means, and a display means located on the ground along the runway for communicating information representing the projected stopping point of the aircraft to a flight crew.

20 Claims, 7 Drawing Sheets

(56) References Cited

U.S. PATENT DOCUMENTS

| | | | | |
|---|---|---|---|---|
| 7,605,688 B1* | 10/2009 | Seah | | G01S 13/825 340/425.5 |
| 7,679,528 B1* | 3/2010 | Etherington | | G01S 1/70 340/945 |
| 7,755,514 B2* | 7/2010 | Kaminski | | B64F 1/20 340/953 |
| 7,908,079 B1* | 3/2011 | Dabney | | G08G 5/065 701/1 |
| 7,916,042 B2* | 3/2011 | Constans | | G08G 5/025 340/945 |
| 8,645,004 B2* | 2/2014 | Anderberg | | B64F 1/3055 14/71.5 |
| 2002/0105432 A1* | 8/2002 | Pederson | | B60Q 1/2611 340/815.45 |
| 2008/0012729 A1* | 1/2008 | Constans | | G05D 1/0083 340/973 |
| 2008/0231474 A1* | 9/2008 | Chang | | G08G 5/0026 340/983 |
| 2008/0300741 A1* | 12/2008 | Constans | | G08G 5/025 701/16 |
| 2009/0125169 A1* | 5/2009 | Edwards | | G08G 5/0013 701/16 |
| 2009/0201190 A1* | 8/2009 | Huthoefer | | G01S 7/003 342/27 |
| 2009/0217468 A1* | 9/2009 | Anderberg | | B64F 1/3055 14/71.5 |
| 2009/0292483 A1* | 11/2009 | Journade | | G08G 5/0008 702/33 |
| 2010/0145599 A1* | 6/2010 | Wise | | G01C 21/00 701/120 |
| 2013/0261854 A1* | 10/2013 | Feyereisen | | G01C 23/00 701/16 |
| 2014/0257601 A1* | 9/2014 | Horne | | B64D 45/00 701/16 |
| 2014/0354456 A1* | 12/2014 | Gannon | | G08G 5/0047 340/972 |
| 2015/0081142 A1* | 3/2015 | Henderson | | B64D 45/04 701/16 |
| 2015/0120098 A1* | 4/2015 | Catalfamo | | G08G 5/02 701/16 |

OTHER PUBLICATIONS

Wikipedia.org. "Approach Lighting System". Archived on Jun. 23, 2011 by archive.org. Accessed on Mar. 29, 2018. (Year: 2011).*

* cited by examiner

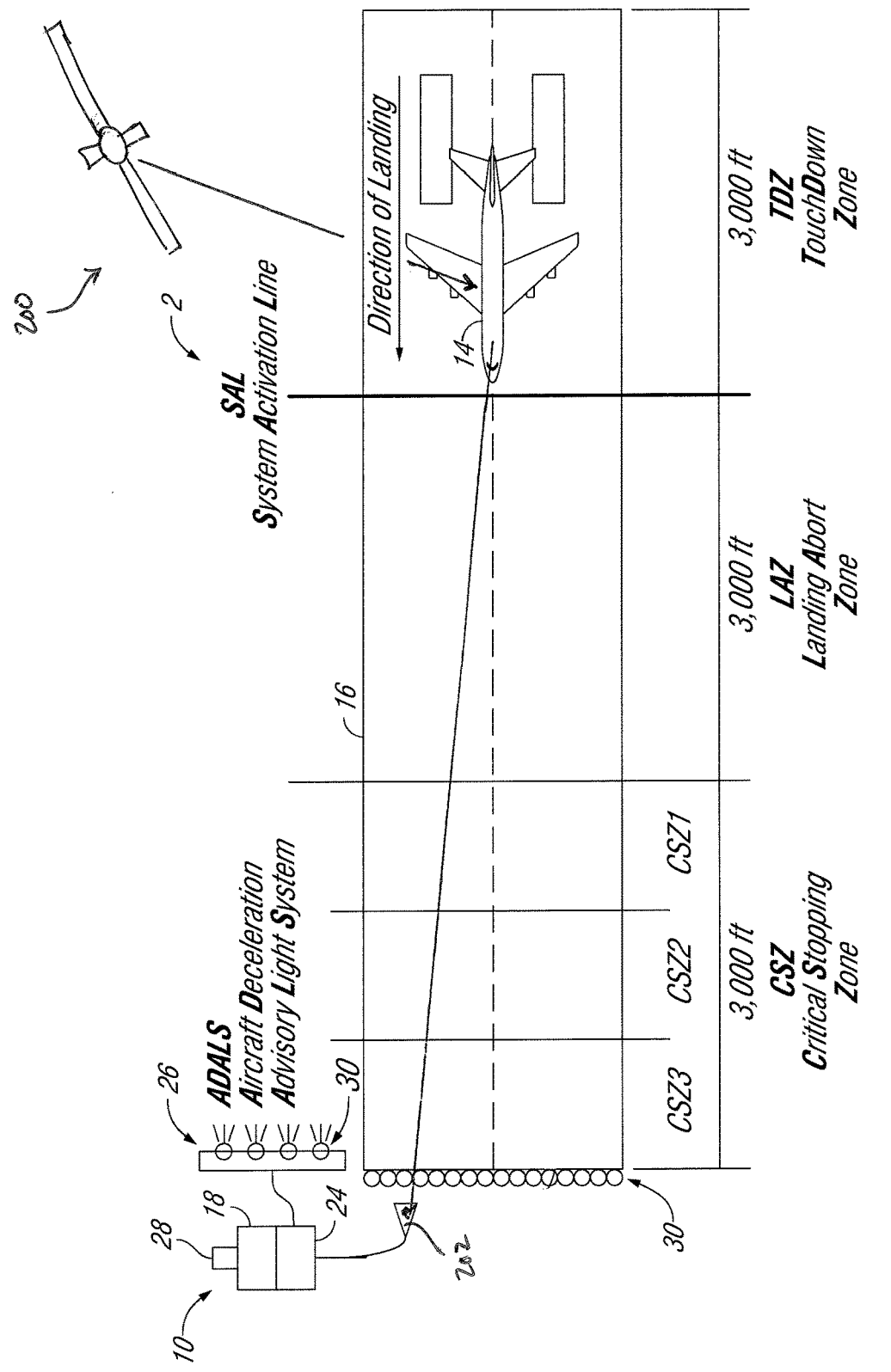

SYSTEM AND METHOD FOR DYNAMICALLY DETERMINING RUNWAY STOPPING DISTANCE

CROSS-REFERENCE TO RELATED APPLICATIONS

This application is a Continuation-in-Part of U.S. patent application Ser. No. 14/661,045, filed on Mar. 18, 2015, which is a continuation of U.S. patent application Ser. No. 13/432,085 (now U.S. Pat. No. 9,014,881), filed on Mar. 28, 2012, both of which are hereby incorporated by reference herein in their entireties.

FIELD OF THE INVENTION

The present invention relates to a system and a method for use in runway operations of an aircraft that provides a ground based visual indication of the predicted stopping point on a runway and, in particular, a stopping point that is calculated from real time conditions during a landing or an aborted take-off.

BACKGROUND OF THE INVENTION

A critical aspect of flight operations is the application of brakes during landing to slow the aircraft after touchdown. There are various visual indicators used for landing an aircraft, such as runway markings, distance indicators, and colored lights. These visual indicators are used to facilitate the alignment and position of the aircraft and to indicate the end of the runway. The flight crew may also have use of information obtained during advanced planning, such as runway length, Airplane Flight Manual performance data, and reported runway conditions. Notwithstanding advance planning, operationally, the flight crew must estimate deceleration and the distance remaining to the end of the runway during every landing.

The estimated deceleration is a function of the management of the following critical variables:
  a) Runway distance remaining after touchdown to the end of the runway;
  b) Runway distance remaining after touchdown to a planned taxiway exit;
  c) Runway distance remaining after touchdown to a required stopping point such as an intersecting runway during Land and Hold Short Operations (LAHSO);
  d) Runway distance remaining for stopping during an aborted take-off.

During landing, pilots do not have the ability to verify that the current deceleration is sufficient for the length of runway remaining and that he will not overshoot the end of the runway. Ground based instrumentation for determining if and where an aircraft will stop on the runway is not currently available.

Overshooting the end of the runway is referred to as a runway excursion. Several major risk factors have been associated with runway excursions during landing, which include: go-around not conducted, touchdown long (long landings), ineffective braking technique, contaminated runways, landing gear malfunction, approach fast, fast touchdown, and steep approach angle.

Prevention strategies have been suggested to address these major risk factors. There are two primarily accepted means of mitigating the risk of runway excursions during landing: (1) the development of stabilized approach criteria and stabilized landing criteria, (2) reinforcement of rigorous Standard Operating Procedures. While pursuing means of improving industry best practices is admirable, the critical tasks of estimating and executing a safe stop of an aircraft on the runway under real-time conditions remain with the flight crew.

Electronic vertical and lateral guidance exists during an approach to landing as a primary means to aiding flight crews to achieve a stabilized approach. However, such approach guidance ends upon touchdown, and once on the runway, the flight crew is constantly estimating whether the deceleration level is adequate (with the use of brakes, thrust reversers, and ground lift dumping devices). Similarly, the flight crew must mentally estimate whether the aircraft will have sufficient runway to fully decelerate under the given conditions when take-off is aborted.

To aid the flight crew during landing, certain standardized runway configurations provide visual information such as, stripes, markers at predetermined distances of 500', 1000', 1500', chevrons, and runway light systems for runway maneuvering procedures. Although these visual aids help the flight crew in determining their physical location on the runway, the pilots must continually estimate whether the deceleration rate is adequate to stop the aircraft in the distance remaining on the runway.

During a precision approach, lateral and vertical guidance is intended to yield a stabilized approach with sufficient runway to stop the aircraft. However, during a landing approach, the traditional means of electronic guidance ends when the aircraft passes over the threshold of the landing runway. Upon passing this threshold, the thrust or power levers are retarded to idle and the landing flare is initiated, with all following aspects of the landing being based on the flight crew's personal perception of depth, distance, and deceleration.

Once on the runway, the runway conditions influence whether the aircraft is able to stop before reaching the end of the runway. The flight crew may receive runway condition information from a number of sources, which will affect judgment.

One source of runway conditions is Pilot Braking Action Reports, which can be affected by the reporting crew's experience and the equipment they are operating. The terminology recommended by the International Civil Aviation Organization (ICAO) is "good", "good to medium", "medium to poor", and "poor"; and the Federal Aviation Administration (FAA) is "good"," "fair," "poor", and "nil." Pilot Braking Action Reports are generally the most recent information available. Therefore, the Pilot Braking Action Report is able to provide information about changing runway conditions.

The airplane's weight, approach speed, amount of wheel braking applied, and the location on the runway where the highest amount of wheel braking is used are factors that influence braking action assessments. Therefore, the flight crew of a small airplane may perceive different braking conditions than the flight crew of a large airplane making these reports subjective.

Sources of runway condition reports may be included in routine notices to airmen (NOTAMs), snow-related NOTAMs (SNOWTAMs), automated terminal information system (ATIS) broadcasts, or via ATC communications with the flight crew. For a short flight, the flight crew may have NOTAMs and/or SNOWTAMs available prior to departure that enable them to perform a preliminary evaluation of the airplane's capability based on conditions reasonably expected at the time of arrival. The flight crew must recognize that conditions may change during the flight and that an update will be required prior to landing. Consequently, all sources of reporting tend to be independent and require additional evaluation in flight with respect to operational decisions. Moreover, even with these sources, information regarding runway conditions may not be available or the conditions may be materially different from those previously reported. Thus, the burden is placed on the flight crew to evaluate the braking operation in real-time.

Runway friction reports is another source for runway conditions. There are several methods available for objectively determining the runway conditions for the runway friction reports. One method uses a vehicle equipped with a decelerometer that measures the deceleration of a test vehicle during a maximum-effort stop, which is converted to a friction rating. Another method measures the force on a braked wheel, typically a towed vehicle, and calculates the friction from the forces on this wheel for typically each third of the runway. However, while ground friction (wheel) reports are typically objective and predictive, the FAA and ICAO warns that ground friction (vehicle) reports are not considered reliable when the depth of contaminant exceeds 1 mm of water; 3 mm of slush or wet snow; or 2.5 cm (1 in) of dry snow. Similarly, such reports may not be measurable under certain conditions and/or the reported frictional measurement can be materially different from that reported, placing the burden on the flight crew to evaluate the braking operation in real-time.

Further, the flight crew may not readily perceive the effect of the real-time braking operation. Accordingly, there is a need for a dynamic real-time indication system and method that overcomes these deficiencies of reports of braking conditions, which are subjective and can quickly become obsolete, e.g. snow, making conditions worse than previously reported.

SUMMARY OF THE INVENTION

Therefore, there is a need for instrumentation that determines a real-time, dynamic value of the runway distance remaining and the actual instantaneous stopping point based on current deceleration effort. Further, there is a need to provide this information to the flight crew. Accordingly, the presently disclosed system and method provide a real-time indication of the Distance Remaining and Projected Stopping Point, as it is measured, and a means of aiding flight crews during the runway maneuvers.

Also, the flight crew will benefit from having instrumentation capable of calculating the deceleration of the aircraft under various conditions coupled with a ground based visual display of relevant information that allows the flight crew to make appropriate decisions regarding runway maneuvers, such as braking, abort take-off, and go-around.

Accordingly, a system and method has been provided herein for determining the remaining runway distance and projected stopping point, and to visually convey important information regarding runway maneuvers to the flight crew. By using the presently disclosed system and method, the flight crew is able to visually determine the remaining runway distance and stopping point in real-time, under changing conditions. Thereby solving a long felt need and provides particular advantages to flight operations.

The system and method of the present disclosure can be utilized to provide decision-making gateways or cues in conjunction with performance analysis and Standard Operating Procedures. For example, a gateway for positive decision-making of a required go-around maneuver can be provided by the present disclosure. Thereby providing additional advantages, which include mitigating the risk of a go-around being conducted too late in the landing, roll sequence. Similarly, decision gateways can be established in a positive manner by the presently disclosed system and method regarding a committed-to-stop point in the landing sequence, beyond which a go-around should not be attempted for turbine-powered aircraft. Thus, eliminating ambiguity for flight crews making decisions during time-critical events to help avoid fatal accidents.

Accordingly, the present disclosure provides a system for determining a projected stopping point of an aircraft on a runway. The system includes a radar device having a transceiver, an integrated circuit having a computer processor and a database, and a display. The transceiver is configured to acquire data regarding a position of the aircraft upon approaching the runway. The integrated circuit is adapted to determine a distance remaining defined as the distance between the aircraft and the end of a runway by utilizing the data obtained by the transceiver. The display is adapted to present a ground based visual indicator, associated with the distance remaining and the projected stopping point, to the flight crew of the aircraft.

The transceiver may include a plurality of transceivers arranged along the runway or near the runway ends. It is envisioned that multiple transceivers be connected with the integrated circuit. The transceivers may be arranged near the end of the runway, furthest from the approaching aircraft. Each of the transceivers is configured to acquire data regarding the position of the aircraft. It is envisioned that the transceiver includes a 24 GHz K-Band radar transceiver capable of sensing the instantaneous position of the aircraft.

The database has the ability to store data regarding the configuration of the runway. The computer processor uses data acquired from the transceiver to calculate the current position of the aircraft relative to the runway, current speed of the aircraft, and deceleration of the aircraft, and projected stopping point based on current location and deceleration. Further, the integrated circuit determines if the current deceleration is sufficient for the aircraft to reach zero velocity in the linear distance remaining. The integrated circuit is calibrated to the specific runway to which it is installed. Further, the integrated circuit is programmed to include specific information regarding the configuration of the runway, runway data.

A method for determining and providing visual feedback regarding the braking performance of an aircraft on a runway is also provided herein. The method includes the steps of acquiring the position of the aircraft on the runway; determining the instantaneous deceleration of the aircraft; calculating the distance that the aircraft will travel before reaching a predetermined speed; and presenting the distance remaining on a ground based display to the flight crew in the runway environment.

Another method for determining and providing visual feedback regarding the braking performance of an aircraft on a runway is also provided herein. The method includes the steps of obtaining position data from transceivers located along the runway, or near the runway ends; determining a deceleration rate for the aircraft; calculating a projected stopping point for the aircraft based on current location, speed, and deceleration; and presenting the projected stopping point to the flight crew of the aircraft.

Yet another system for determining a stopping point of an aircraft on a runway includes a position sensing means for gathering data regarding incremental positions of the aircraft relative to the runway, a calculating means for dynamically computing the projected stopping point of the aircraft based on the data gathered by the position sensing means, and a display means located on the ground along the runway for communicating information representing the projected stopping point of the aircraft to a flight crew. The position sensing means may include an Automatic Dependent Surveillance-Broadcast system having at least one receiver located on the ground near the runway. The receiver is configured to receive the data regarding the incremental positions of the aircraft from the aircraft and to transmit the data to the calculating means.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The accompanying drawings, which are incorporated in and constitute a part of this specification, illustrate embodiments of the disclosure, and together with a general description of the disclosure given above, and the detailed description of the embodiments given below, serve to explain the principles of the disclosure.

FIG. 7 is an Aircraft Deceleration Advisory Light System in accordance with another embodiment of the present disclosure, utilizing an Automatic Dependent Surveillance-Broadcast system.

Other features and advantages of the present disclosure will become apparent from the following detailed description, taken in conjunction with the accompanying drawings, which illustrate, by way of example, the principals of the invention.

DETAILED DESCRIPTION OF THE PREFERRED EMBODIMENTS

As used herein, the directional terms, "front," "forward," "rear," "rearward," "up," "upward," "down," "right," "left," "top," and "bottom" refer to the runway as orientated with regard to the approaching aircraft as would be understood by one of ordinary skill in the art.

The present disclosure provides a system and a method to assist in the braking of an aircraft on a landing runway. Further, the present disclosure provides the flight crew of any fixed-wing aircraft with an external visual indication of the predicted stopping point during landing or an aborted take-off attempt.

Further, the presently disclosed system and method provides the flight crew with tools to mitigate specific landing operation risks. Among these risks are:
(1) Missed approach or balked landing not being conducted when necessary;
(2) Aircraft landing long;
(3) Where visible cues are diminished at decision height (DH) due to weather, and there is inaction (or slow reaction) by the crew as the available runway decreases;
(4) The crewmembers become committed to the landing and believe their go-around option no longer exists;
(5) The touchdown is long because the aircraft floats due to excess speed over the threshold;
(6) Selection of the thrust reversers is delayed, as well as the subsequent application of full reverse thrust;
(7) Braking is diminished because of braking factors; and
(8) Runway conditions limit braking capacity because of ice, slush, rain, mud or other runway conditions;
(9) Slow or insufficient use of brakes.

Figure 1:
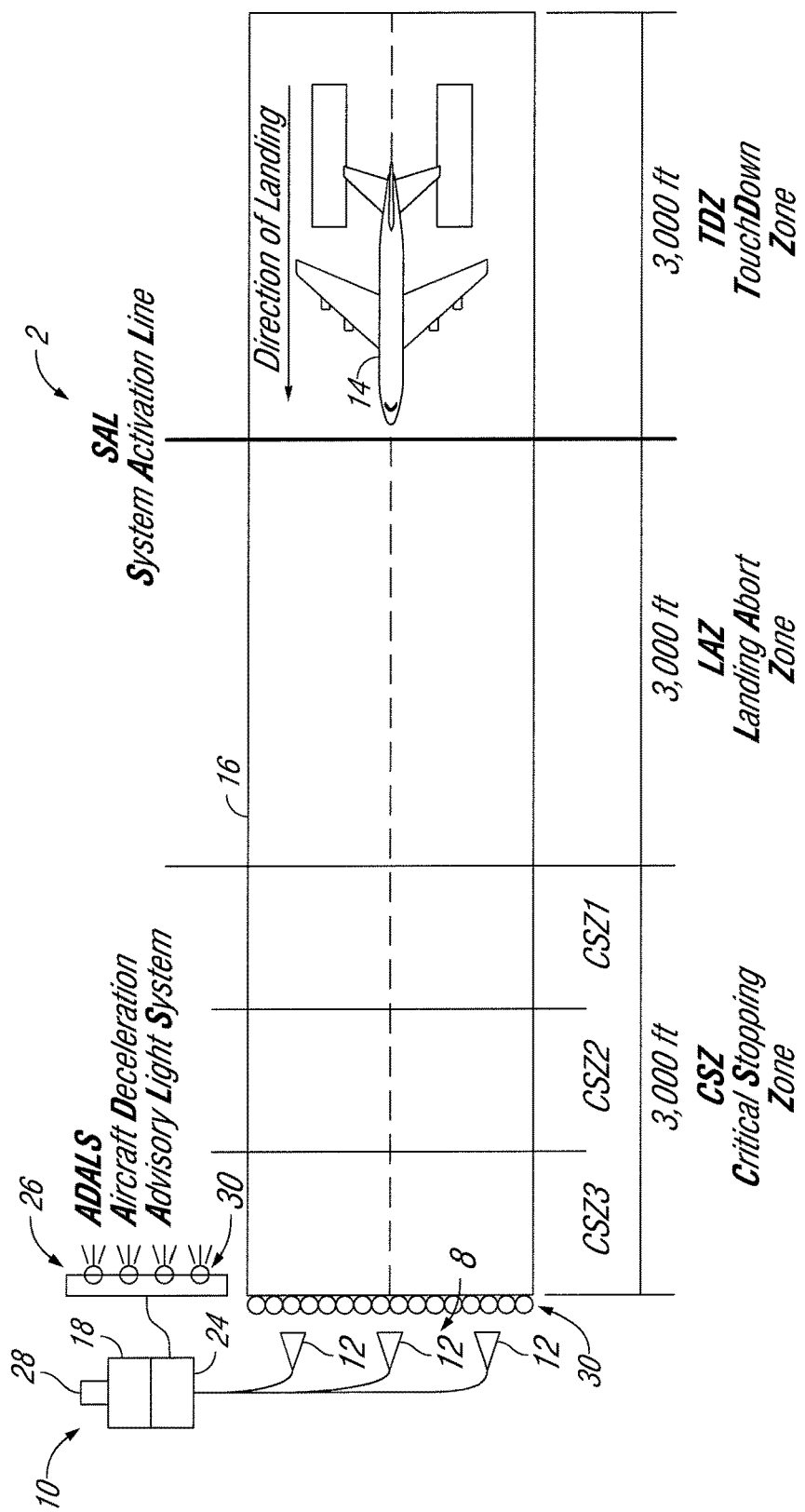
FIG. 1 is an Aircraft Deceleration Advisory Light System in accordance with one embodiment of the present disclosure.

With reference to FIG. 1, the Aircraft Deceleration Advisory Light System (ADALS) 2 includes: a radar device 8 having at least one transceiver 12 for acquiring the position of the aircraft 14 on the runway 16; an integrated circuit 10 having a database 18 with information about the runway 16, such as runway starting point 20, and a computer processor 24 for determining the current position, speed, and deceleration of the aircraft 14, and for calculating the distance that the aircraft 14 will travel before stopping; and a display 26 for conveying the distance information to the pilot or flight crew, and for visually indicating a predicted stopping point.

The ADALS 2 acts as a decision aid for the crew of the aircraft by displaying various information regarding an assortment of decision points to the flight crew during the execution of a landing or rejected take-off attempt. These visual displays help the flight crew adapt the braking, apply more or less braking, to reach a desired point or speed. Further, the ADALS 2 notifies the flight crew to specific decisions that must be made and when, such as, but not limited to, aborting landing, aborting take-off, and performing a go-around. Still further, the ADALS 2 has the ability to notify the flight crew when a particular maneuver is no longer a viable solution.

Figure 2:
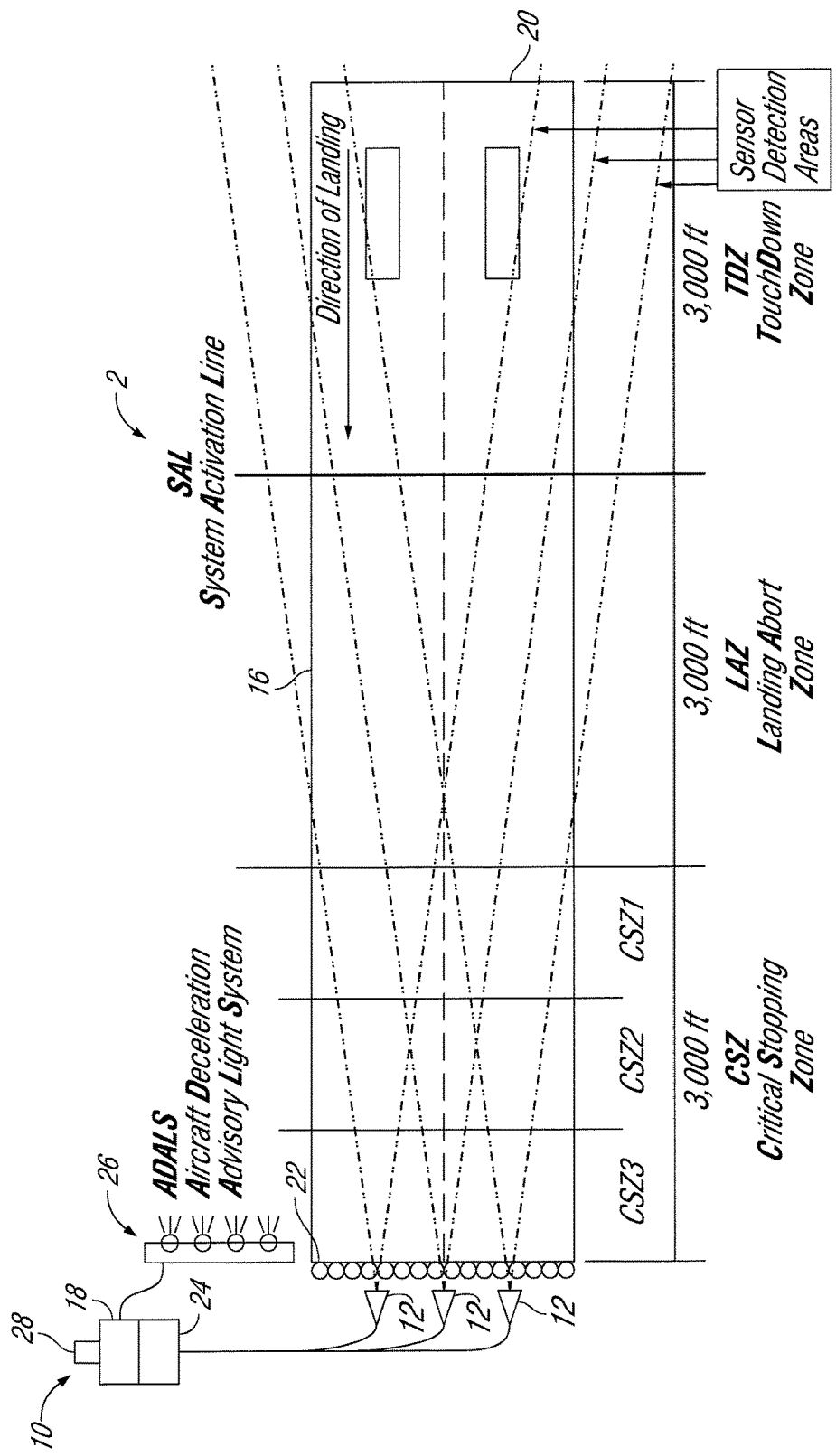
FIG. 2 illustrates an overlapping field of view of transceivers (sensors) of the Aircraft Deceleration Advisory Light System in accordance with FIG. 1.

With additional reference to FIG. 2, a plurality of transceivers 12 are directed toward on-coming air traffic to determine the position of the aircraft 14. Each transceiver 12 is able to emit a signal and to receive a returning signal from the target aircraft 14. The transceivers 12 constantly transmit and receive the signals along the runway 16 for continuously monitoring the location of any aircraft 14 on or near the runway 16 and provide a positional signal regarding the aircraft 14 to the integrated circuit 10. The transceiver 12, as presently disclosed, is a 24 GHz K Band radar transceiver. However, others are contemplated.

Further, it is envisioned that other sensing devices known in the art be used to determine the aircraft position. These sensing devices may include, but are not limited to, laser or light emitting and receiving transceivers and the like.

The database 18 has the ability to be programmed to include information about the runway 16, such as a runway starting point 20 or ending point 22 and the length of the runway 16. The database 18 is capable of providing runway information to the computer processor 24.

It is envisioned that the database 18 also contains other positional information concerning the runway 16, for example, the position of a runway exit, the maximum speed at which an aircraft may take the exit, and a maximum speed at which an approaching aircraft 14 can safely land on the runway 16. Still further, it is envisioned that the database 18 contain other information used to determine the particulars of the aircraft 14, such as, but not limited to, cross-sectional area of aircraft or engine, and specifications of certain aircraft that frequently use that particular runway.

The ADALS 2 includes a beacon receiver 28 for receiving an incoming signal emitted from the aircraft 14. The beacon receiver 28 is in communication with the integrated circuit 10. The incoming beacon signal contains various information about the aircraft 14, such as, but not limited to, type of aircraft, weight of aircraft, speed of aircraft, position of aircraft, and typical stopping distance of the aircraft 14. The incoming beacon signal may also provide enough information to allow further data to be retrieved from the database 18.

The beacon receiver 28 provides the computer processor 24 with basic information regarding the aircraft 14, which allows the computer processor 24 to retrieve information regarding the aircraft 14 from the database 18, along with information regarding the aircraft's 14 past breaking performance on the runway 16.

It is envisioned that the database 18 contain information regarding the aircraft that may be obtained by the computer processor 24 based on the received information, such as from the beacon receiver 28. Other sources of information are also envisioned that include, but are not limited to, input from a control tower, input received from another transceiver, and other sources of information known in the art.

The integrated circuit 10 uses the computer processor 24 to calculate and determine whether the current aircraft's value of deceleration is sufficient for the aircraft to reach a predetermined velocity within the distance remaining.

The computer processor 24 is connected with the transceivers 12, the database 18, the display 26, and the beacon receiver 28. The computer processor 24 receives the positional signal from the transceivers 12 and determines the position of the aircraft 14 along the runway for the aircraft 14, a speed, and a deceleration for the aircraft 14. The speed and deceleration are calculated by comparing different positional signals. The distance of the aircraft 14 from the transceiver 12 is calculated based on the time it takes the signal to emit from the transceiver 12 and return from the aircraft 14 to the transceiver 12. Multiple transceivers 12 are used to pin point the aircraft's 14 position in relation to the transceivers 12.

The computer processor 24 continually compares the positional signals from the transceivers 12 to determine real time location, speed, and deceleration of the aircraft 14. The computer processor 24 is then able to calculate the distance the aircraft 14 will travel, based on current deceleration, before the aircraft 14 reaches a predetermined speed or stopping point. The computer processor 24 is then able to determine if the aircraft 14 will stop or reach a predetermined speed on the runway 16 based on current location and deceleration.

It is further envisioned that the integrated circuit 10 has the ability to record and store information regarding the landing of the aircraft 14 for the purpose of tracking landing performance and landing performance analysis. This information includes, but is not limited to, landing point, time, stopping point, and model of aircraft. The stored information regarding the landing of the aircraft 14 is retrievable at a later date and is available for analysis.

The integrated circuit 10 is calibrated to the specific runway 16 to which the ADALS is installed, the distance that the aircraft 14 needs for a complete stop may be calculated based on the speed of the aircraft 14 decreasing according to a time-dependent function. The runway distance needed for the aircraft 14 to reach a zero velocity or to stop is calculated by the differences in speed components along the length of the runway.

It is envisioned that the length of the runway may, for example, be stored in an airport database that also contains the various threshold positions, such as the ends of the runway, intersecting runways, the geographic orientation of the runway, and/or exit locations, as well as other information.

The projected aircraft speed is used to determine whether the aircraft 14 will be at a slow enough speed to take an exit when the aircraft 14 reaches the runway exit. The calculated exit speed allows the braking to be adapted, by comparison with the maximum speed, to take the exit. The maximum exit speed may be a predetermined value, such as 30 knots, for example, that is preprogrammed into the database 18 and accessible to the computer processor 24.

The computer processor 24 then uses the information from the database 18 and the transceiver 12 to determine if the aircraft 14 will stop on the runway 16, or be at a slow enough speed to egress through the exit, or stop before a predetermined location such as a crossing or intersecting runway during Land and Hold Short Operations (LAHSO), based upon the current position, speed, and deceleration of the aircraft.

Figure 3:
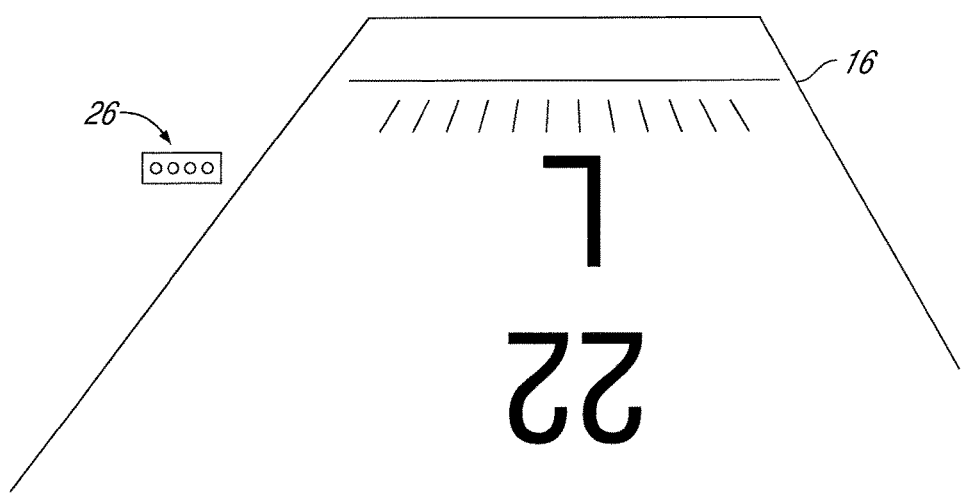
FIG. 3 is a display of the Aircraft Deceleration Advisory Light System located adjacent to an end of the runway in accordance with FIG. 1.

With additional reference to FIG. 3, as disclosed herein, a single display 26 is located adjacent to the end of the runway 16. The display 26 is a single row of multiple lights or a linear array of electronic placard signs. However, it is envisioned that the type of display may vary and include, but not limited to, displays such as digital displays and strings of light-emitting diodes, as well as, projective technology.

It is envisioned that the linear array of electronic placard signs is capable of displaying numeric digits, and being aligned along the runway 16 at prescribed incremental distances—typically 1,000 feet.

It is envisioned that the display 26 continuously displays a color-coded lighted/LED digital read-out of the distance remaining.

The display 26 conveys important information to the flight crew regarding the projected stopping point, current rate of deceleration, speed, projected exit, and position of the aircraft 14 in an easy to understand manner. By displaying the information in a color-coded scheme, the display 26 is able to quickly convey this important information to the flight crew. As disclosed herein, the display 26 provides the distance values in various colors, with each color having a different meaning, one example of the colors used and their meaning is as follows:

RED, the current deceleration rate is insufficient for the landing aircraft to reach zero velocity in the runway distance remaining;

AMBER, the current deceleration rate is sufficient for the aircraft to reach zero velocity in the runway distance remaining; and GREEN, the current deceleration rate is sufficient for the aircraft to reach zero velocity in the runway distance remaining prior to the buffer distance.

It is also envisioned that other color schemes, including combinations of colors be used to convey information to the flight crew.

Further, it is envisioned that the display 26 has the ability to convey other meaningful information to the flight crew including, but is not limited to:

the predicted distance to reach the controlled speed of the aircraft;

the ability to shorten or lengthen the stopping distance or the distance to reach the controlled speed of the aircraft; and the remaining distance of the runway 16.

Further, the position of the airplane 14 may also cause the computer processor 24 to activate visual alerts on the display 26 when the airplane 14 approaches a boundary of the runway 16, such as the end point 22, in order to alert the flight crew and ground crews to a dangerous condition.

The ADALS 2 includes the ability to determine when the aircraft 14 has penetrated or will penetrate a preset boundary and to alert the airport staff and flight crew to the impending excursion. Examples of these boundaries include, but are not limited to, sides and ends of the runway 16, and the stopping distance of the aircraft 14 is greater than the distance remaining to reach the end of the runway, or other conditions that indicate that the airplane's projected path will lead to an excursion.

The ADALS 2 includes a communication connection 32 connected with air traffic control, emergency services, and/or local first response services in the case of airports with no such services on the field. The communication connection 32 provides emergency services with a real-time warning of a runway excursion to limit response time.

In operation, if the integrated circuit 10 determines that the current deceleration rate is insufficient for the landing aircraft to reach zero velocity in the runway distance remaining, the integration circuit 10 provides a signal to the display 26 for presenting the information in RED. If the integrated circuit 10 determines that the current deceleration rate is sufficient for the aircraft to reach zero velocity in the runway distance remaining, but only in a prescribed minimum buffer distance from the end (typically 1,000 feet), the integration circuit provides a signal to the display 26 for presenting the information in AMBER. If the integrated circuit 10 determines that the current deceleration rate is sufficient for the aircraft 14 to reach zero velocity in the runway distance remaining prior to the buffer distance, the integrated circuit 10 provides a signal to the display 26 for presenting the information in GREEN.

With reference to FIGS. 1 and 2, the typical zones for a typical 9,000 ft runway are illustrated. The zones include Touchdown Zone (TDZ), Landing Abort Zone (LAZ), and Critical Stopping Zone (CSZ). Normally the airplane approaches the runway attempting to land in the TDZ. ADALS is actively sensing the approaching airplane as it crosses the beginning of the runway (threshold), but the display of the ADALS is not illuminated until the airplane crosses the System Activation Line (SAL).

A first critical decision is if the pilot has not touched the wheels down on the runway when the ADALS' display illuminates by the aircraft passing the SAL. Therefore, the aircraft was not landed in the TDZ, and the flight crew must, without hesitation, initiate the go-around procedure.

A second critical decision is if the aircraft does touchdown prior to seeing the ADALS illuminated, indicating that the aircraft has landed in the TDZ, and the display of the ADALS is presented in all red. Therefore, the current rate of deceleration is insufficient to stop the aircraft before the end of the runway. As a result, the flight crew must increase the braking effort (brakes, thrust reversers, ground spoilers, etc).

As the braking effort is increased and the deceleration becomes sufficient such that the airplane will stop before the end of the runway, the ADALS display will transition from red to green, and the number of lights transitioning from red to green will be in proportion to the extra buffer distance predicted to be remaining once the airplane has come to a stop or reached safe speed.

An example of the color pattern that indicates that the aircraft will stop on the runway is:

1) if the projected stopping point is in CSZ3 then one (1) green light,
2) if the projected stopping point is in CSZ2 then two (2) green lights,
3) if the projected stopping point is in CSZ1 then three (3) green lights.

As a result, it is readily appreciated that the more green lights the better, in the sense that the stopping point moves up-field away from the end of the runway.

The visual cues, as discussed above, and the pattern of transition approximate and are consistent with traditional visual cues presented by visual/precision approach slope/path indicator (VASI/PAPI) lighting systems used to provide approach slope guidance to aircraft flight crews during final approach to a runway 16. The presently disclosed ADALS 2 operates to provide critical dynamic landing performance information to the flight crew of any aircraft, independent of size, weight, or configuration.

In another embodiment, a pre-determined value of runway distance is derived prior to landing, based on specific aircraft type, weight, configuration, and runway surface condition. The display 26 indicates the remaining distance in red as the aircraft 14 passes by a first display 26 to indicate a stop is no longer possible at the current rate of deceleration prior to the end of the runway. Therefore, it is conveyed to the flight crew that the flight crew should conduct a balked landing/go around maneuver.

Figure 4:
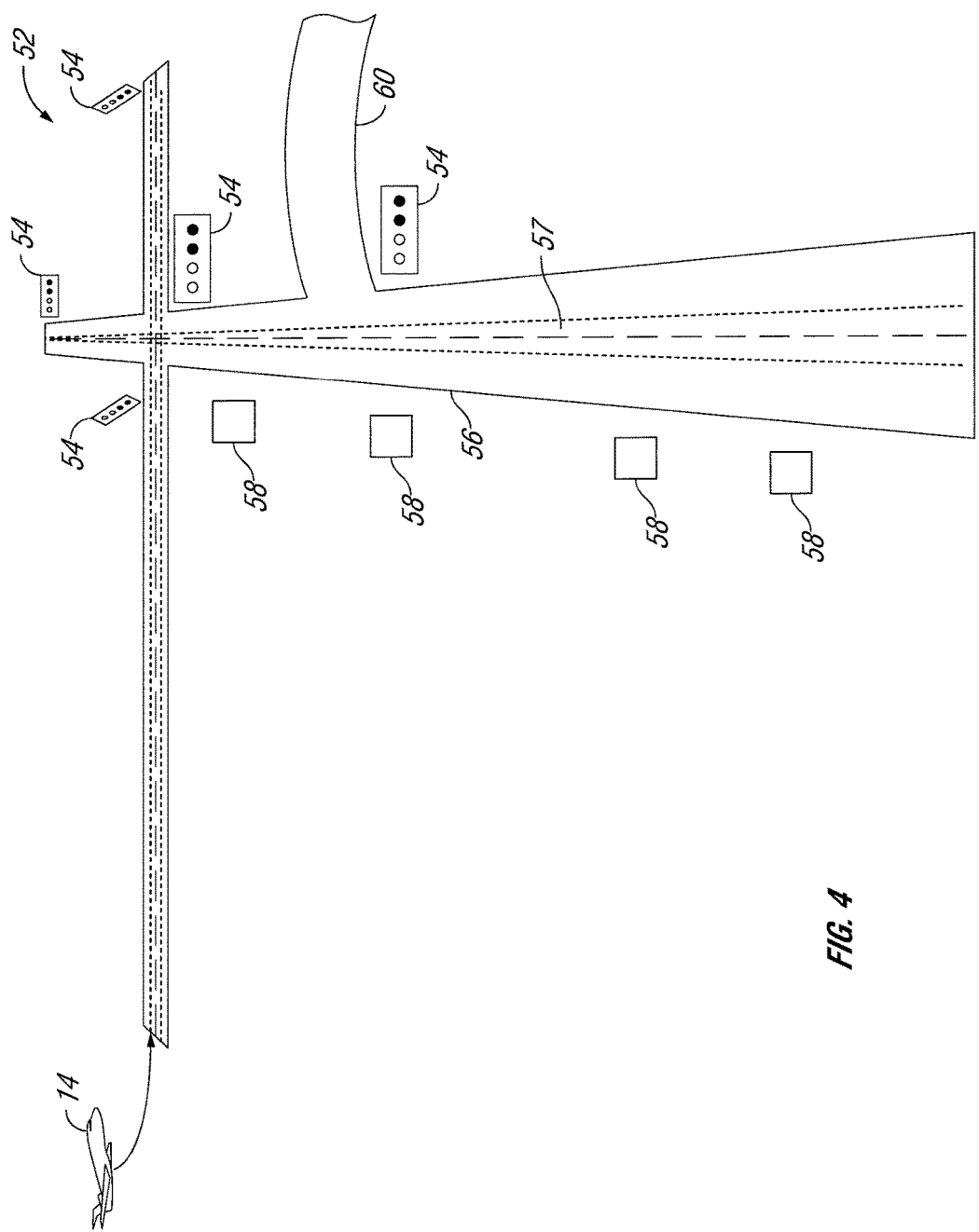
FIG. 4 is an Aircraft Deceleration Advisory Light System in accordance with another embodiment of the present disclosure having multiple displays along a crossing runway.

With reference to FIG. 4, another embodiment of an ADALS 52 having multiple displays is shown. As the landing aircraft 14 progresses from the threshold-crossing screen height toward the runway 56, the flight crew will be able to see and monitor the value and color of the distance remaining on the display 58 located along the edge of the runway 56. During normal landings, the flight crew will perceive a progression of color change to reflect the varying distance remaining. Initially all signs will display the distance remaining in red, but as the aircraft decelerates the most distant signs will transition from red, then to amber, then to green in a manner progressively up-field toward the aircraft 14, as the aircraft 14 progresses down-field. The transitioning pattern of red to amber to green, serves as a barometer for the flight crew to judge whether the landing is progressing normally. Further, this transitioning pattern indicates that the projected stopping point is along the runway 56.

Displays are also located at other locations visible to the flight crew. Display 57 includes lights embedded within the runway 56.

Further, the ADALS 52 has several displays 54 located at various positions along the runway 56. Each display 54 is associated with different decision points, such as, but not limited to, a first display conveying information regarding a stopping point on the runway at an intersecting runway, a second display to convey information regarding an exit 60 location and speed, and a third display conveying information about the overall length of the remaining runway 56 and the ability of the airplane 14 to stop within the distance remaining given the current location, speed, and deceleration of the aircraft 14.

Figure 5:
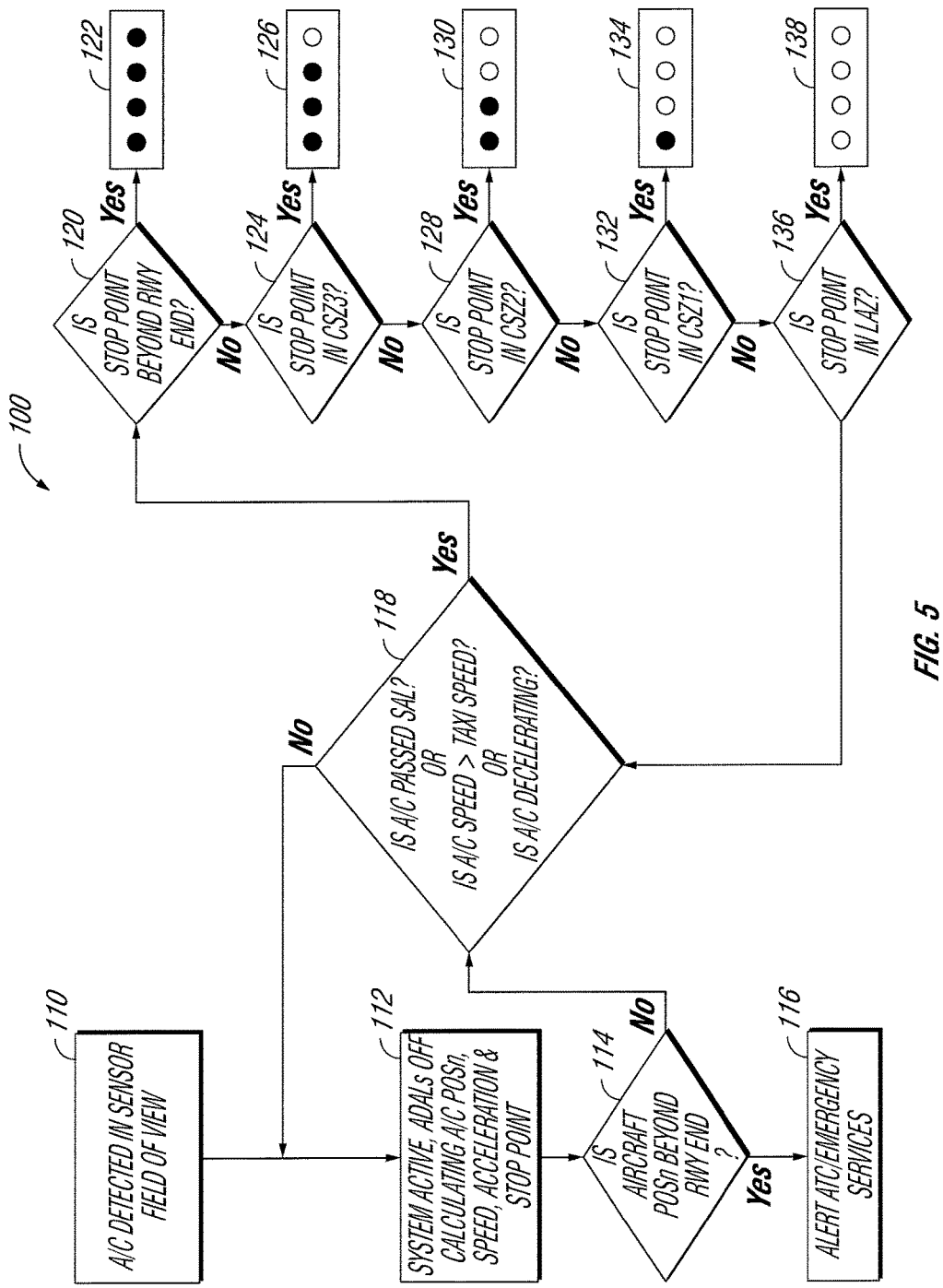
FIG. 5 illustrates a method of providing an Aircraft Deceleration Advisory Light System according to one embodiment of the present invention.

Operationally, the flight crew uses ADALS as a definitive decision-point aid. With reference to FIGS. 1 and 5, a method 100 for providing a decision making aid to a flight crew performing a maneuver on a runway is provided. The transceivers 12 of the above discussed ADALS 2 are arranged about the runway 16 to establish a field of view during installation of each transceivers 12 that extends toward on-coming air traffic. The transceivers 12 detect 110 any airplane 14 or other large objects that are within the transceivers' 12 field of view. As discussed above, the transceivers 12 constantly monitor their field of view and produce a positional signal that is sent to the computer processor 24.

The computer processor 24 calculates 112 the current position, speed, and acceleration/deceleration of the aircraft 14, and projects a stopping point based on these values. The computer processor 24 then determines 114 whether the aircraft will have a runway excursion based on the current position, speed, and acceleration/deceleration of the aircraft 14. If it is determined that the aircraft 14 will have a runway excursion the air traffic control and emergency services are contacted 116.

If it is determined that the aircraft 14 will not have a runway excursion, the computer processor 24 then determines 118 if the aircraft 14 has sufficient acceleration/deceleration to perform the given maneuver. If the current acceleration/deceleration is sufficient to perform the given maneuver, the computer processor 24 determines 120, 124, 128, 132, and 136 where the stopping point will be. Once the stopping point is determined, the display 26 will convey information regarding the location of the projected stopping point by presenting 122, 126, 130, 134, and 138 a predetermined light pattern.

Figure 6:
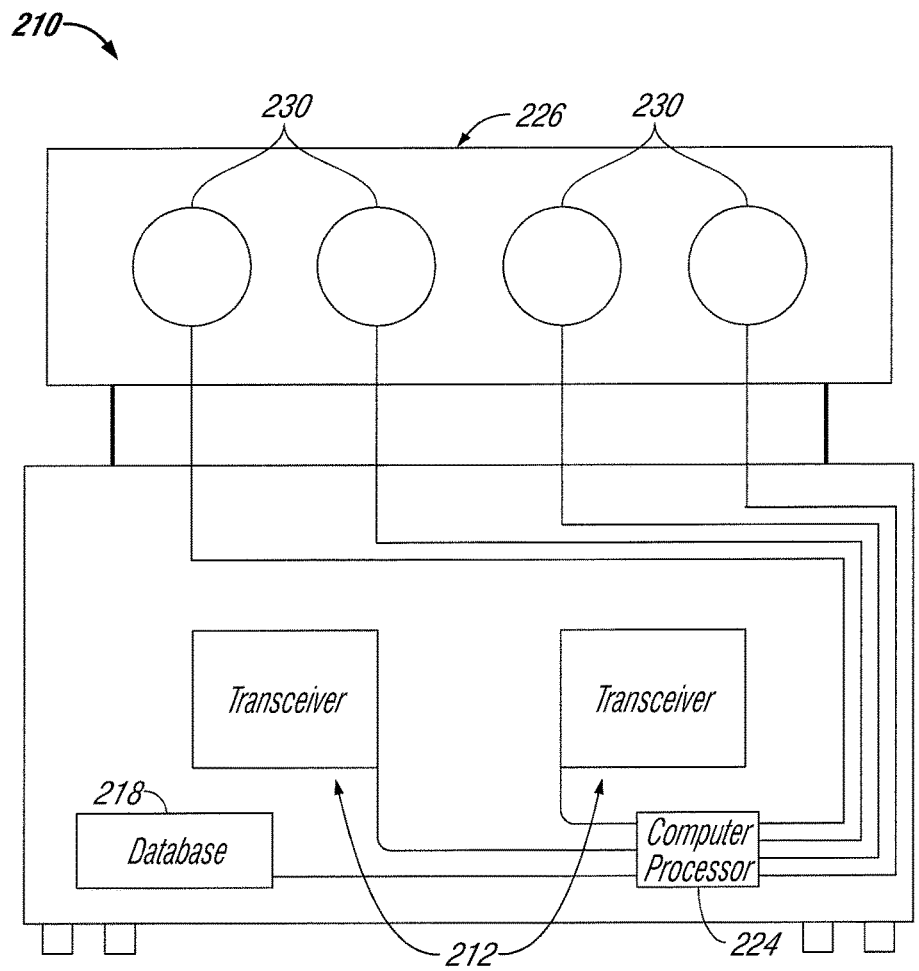
FIG. 6 is a portable Aircraft Deceleration Advisory Light System according to one embodiment of the present invention.

In another embodiment, shown in FIG. 6, the ADALS 210 is a self-contained, portable system. The ADALS 210 contains at least one transceiver 212, a database 218, a computer processor 224, and a display 226. In this embodiment, the ADALS 210 is coupled with a generator or other electrical power source (not shown for clarity) and located adjacent to a runway.

The runway can be an established or temporary runway, as is the case with many fly-ins or military maneuvers. The portable ADALS 210 is designed to be brought into a location, easily set-up, and provide flight crews with important information without the need to permanently install equipment.

The database 218 includes the ability to be programmed by either the aid of a separate computer or by having runway boundaries defined during set-up. The computer processor 224 then uses the predefined parameters during take-off and landing procedures to provide flight crews with information regarding decision points for the purpose of acting as a decision aid.

In another embodiment of the present disclosure, it is envisioned that the ADALS is integrated with existing Airport Surface Detection Equipment.

The advantages of the presently disclosed system and method includes the ability to integrate external conditions on the braking operation, and to present a visual indication of the braking performance to the flight crew for the execution of the proper maneuver, for example, continue or increase the braking, abort the landing, and go around.

It is important to note that the graphic representations of the predicted remaining stopping distance on the landing runway are given purely by way of example. In practice, other representational choices can be used to implement a system according to the invention.

The presently disclosed system also has the advantage of being ground-based and having only a minimal impact on the current onboard equipment. Therefore, the presently disclosed ADALS does not require additional communication or aircraft infrastructure. Consequently, the hardware and software integration cost of ADALS is relatively low. In particular, the integration cost resides with the airport. Furthermore, ADALS has no impact on any operational procedure. The control procedures performed by the ground personnel and the piloting procedures performed by the flight crew remain absolutely unchanged. Utilization of the system provides a simple visual indicator. Therefore, the cost of training personnel is minimal.

As indicated above, the present invention contemplates the use of various sensing devices/systems that can be used to determine the aircraft position, for use by the ADALS 2 for determining and conveying the distance information to the pilot or flight crew, and for visually indicating a predicted stopping point using the display 26. For example, in an embodiment, and with reference to FIG. 7, it is contemplated that the sensing system may be an Automatic Dependent Surveillance-Broadcast (ADS-B) system 200 (which replaces radar device 8), which utilizes ground-based transceivers communicating with transponder-equipped aircraft, from which necessary aircraft dynamics of motion (during landing and takeoff) can be obtained for use by the computer processor 24. In particular, where an ADS-B system is utilized, aircraft obtain their respective positions from satellites such as, for example, from a Global Navigation Satellite System (GNSS). The aircraft then simultaneously broadcast their positions (along with other data) to other aircraft and/or to ground stations equipped to receive it.

In connection with the present invention, a landing aircraft 14 may broadcast its position and altitude, as derived from GNSS of the ADS-B system, to a transceiver or receiver (e.g., transceiver 202) located on the ground at the airport. In an embodiment, the update rate is twice per second (i.e., a refresh rate of 0.5 seconds). The receiver 202 at the airport may then transmit this aircraft position data to the processor 24 of the ADALS 2, which calculates the distance the aircraft 14 will travel, based on current deceleration, before the aircraft 14 reaches a predetermined speed or stopping point, and determines if the aircraft 14 will stop or reach a predetermined speed on the runway 16 based on current location and deceleration, in the manner discussed above. As further discussed above, the processor 24 is then configured to control the display 26 located along the runway to convey important information to the flight crew regarding the projected stopping point, current rate of deceleration, speed, projected exit, and position of the aircraft 14 in an easy to understand manner.

In other embodiments, the sensing system may include a multilateration positioning system that utilizes multiple transceivers to triangulate the position and altitude of an aircraft transmitting using Mode-S transponder on board the aircraft, without ADS-B. This position and altitude information may then be utilized by the processor 24 to calculate the projected stopping point of the aircraft and the like, and to control the display 26 to provide relevant information to the flight crew of the landing aircraft 14.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A system for determining a stopping point of an aircraft on a runway during a landing on the runway or an aborted takeoff on the runway, the system comprising:
   a position sensing means for gathering data regarding incremental positions of the aircraft relative to the runway;
   a calculating means for dynamically computing a projected stopping point of the aircraft based on the data regarding incremental positions of the aircraft relative to the runway gathered by the position sensing means; and
   a display means located on the ground adjacent to the runway for communicating information representing the projected stopping point of the aircraft to a flight crew.

2. The system of claim 1, wherein:
   the position sensing means includes an Automatic Dependent Surveillance-Broadcast system.

3. The system of claim 2, wherein the Automatic Dependent Surveillance-Broadcast system includes at least one receiver located on the ground adjacent to the runway; and
   wherein the receiver is configured to receive the data regarding the incremental positions of the aircraft from the aircraft and to transmit the data regarding the incremental positions of the aircraft to the calculating means.

4. The system of claim 3, wherein the display means is configured to output a go-around visual indication if the aircraft crosses a system activation line without touching down on the runway, the system activation line being a predetermined longitudinal point on the runway; and
   wherein the go-around visual indication indicates to the flight crew that the aircraft should abort landing.

5. The system of claim 3, wherein the receiver and the display means are integrated into a single structure.

6. The system of claim 3, further comprising a beacon receiving means for receiving a broadcast signal from the aircraft.

7. The system of claim 3, further comprising a communication connection for alerting emergency personal of a runway excursion.

8. The system of claim 3, further comprising a beacon receiver to receive a signal emitted from the aircraft.

9. The system of claim 1, wherein the position sensing means is a multilateration positioning system having a plurality of transceivers.

10. The system of claim 1, further comprising database for storing runway data regarding a configuration of the runway.

11. The system of claim 1, wherein the incremental positions include at least a position of the aircraft above the runway, prior to touchdown, and at least a position of the aircraft on the runway, subsequent to touchdown.

12. The system of claim 1, wherein the calculating means includes an integrated circuit for determining the incremental position of the aircraft.

13. The system of claim 12, wherein the integrated circuit includes a computer processor to calculate an instantaneous location, velocity, and deceleration of the aircraft utilizing information received from the position sensing means.

14. A system for determining a stopping point of an aircraft on a runway during a landing on the runway or an aborted takeoff on the runway, the system comprising:
   a position sensing means for gathering data regarding incremental positions of the aircraft relative to the runway;
   a processor in communication with the position sensing means and configured to dynamically calculate a projected stopping point for the aircraft in dependence upon the data regarding incremental positions of the aircraft relative to the runway; and
   a display connected with the processor to present the projected stopping point of the aircraft to a flight crew, the display being located on the ground adjacent to the runway.

15. The system of claim 14, wherein the position sensing means includes an Automatic Dependent Surveillance-Broadcast system.

16. The system of claim 15, wherein the Automatic Dependent Surveillance-Broadcast system includes at least one receiver located on the ground near the runway; and
   wherein the receiver is configured to receive the data regarding the incremental positions of the aircraft from the aircraft and to transmit to the processor.

17. The system of claim 14, wherein the processor includes a database to store runway data regarding a configuration of the runway.

18. A method for predicting a stopping point of an aircraft on a runway during a landing on the runway or an aborted takeoff on the runway, the method comprising the steps of:
   with an Automatic Dependent Surveillance-Broadcast system, gathering multiple data sets regarding an instantaneous position of the aircraft;
   transmitting the multiple data sets regarding an instantaneous position of the aircraft to a ground-based receiver;
   determining a location, velocity, and deceleration for the aircraft using the multiple data sets regarding an instantaneous position of the aircraft; dynamically calculating a projected stopping point for the aircraft based on the determined location, velocity, and deceleration for the aircraft; and
   communicating the projected stopping point to a flight crew of the aircraft by a ground based display located adjacent to the runway.

19. The method according to claim 18, further comprising the step of:
   determining whether the projected stopping point is on the runway.

20. The method according to dam 18, further comprising the step of:
   determining whether the aircraft has touched down on the runway prior to crossing a system activation line, the system activation line being a predetermined longitudinal point on the runway; and
   if the aircraft has not touched down on the runway prior to crossing the system activation line, at the ground based display, outputting a go-around visual indication;
   wherein the go-around visual indication indicates to the flight crew that the aircraft should not land on the runway.

* * * * *

UNITED STATES PATENT AND TRADEMARK OFFICE
CERTIFICATE OF CORRECTION

PATENT NO. : 10,059,466 B2
APPLICATION NO. : 15/170174
DATED : August 28, 2018
INVENTOR(S) : Louis Degagne and Derek Campbell Page 1 of 1

It is certified that error appears in the above-identified patent and that said Letters Patent is hereby corrected as shown below:

In the Claims

Column 14, Claim 20, Line 54 replace the word "dam" with --claim--

Signed and Sealed this
Nineteenth Day of February, 2019

Andrei Iancu
*Director of the United States Patent and Trademark Office*